(12) United States Patent
Mendonsa et al.

(10) Patent No.: US 12,488,807 B2
(45) Date of Patent: Dec. 2, 2025

(54) MULTI-REVOLUTION HARD DISK DRIVES WITH REDUCED SERVO OVERHEAD

(71) Applicant: SEAGATE TECHNOLOGY LLC, Fremont, CA (US)

(72) Inventors: Riyan Alex Mendonsa, Edina, MN (US); Joshua Ward Christensen, Savage, MN (US); Nathan Andrew Blilie, Elko New Market, MN (US); Patrick J. Korkowski, Shakopee, MN (US); Jon D. Trantham, Chanhassen, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 18/809,467

(22) Filed: Aug. 20, 2024

(65) Prior Publication Data
US 2025/0364008 A1 Nov. 27, 2025

Related U.S. Application Data

(63) Continuation-in-part of application No. 18/672,636, filed on May 23, 2024.

(51) Int. Cl.
*G11B 5/55* (2006.01)
*G11B 5/52* (2006.01)
*G11B 5/58* (2006.01)
*G11B 5/596* (2006.01)
*G11B 20/12* (2006.01)

(52) U.S. Cl.
CPC ............ *G11B 5/52* (2013.01); *G11B 20/1217* (2013.01); *G11B 2020/1282* (2013.01)

(58) Field of Classification Search
CPC ......... G11B 5/54; G11B 5/58; G11B 5/59627; G11B 21/106; G11B 5/596; G11B 5/59605; G11B 5/59688; G11B 5/59623; G11B 5/012; G11B 27/36; G11B 20/12; G11B 21/12; G11B 20/10009; G11B 5/00; G11B 5/5547; G11B 5/5543; G11B 5/56
USPC .......................................................... 360/48
See application file for complete search history.

(56) References Cited

U.S. PATENT DOCUMENTS 9,508,370 B1 * 11/2016 Zhu ..................... G11B 5/59627
10,748,568 B1 8/2020 Chahwan et al.

OTHER PUBLICATIONS

Nie, "A Tutorial on Control Design of Hard Disk Drive Self-Servo Track Writing", *Information Storage Industry Consortium and the Computer Mechanics Laboratory at UC Berkeley*, Sep. 15, 2009. 10 pages.

* cited by examiner

*Primary Examiner* — Nabil Z Hindi
(74) *Attorney, Agent, or Firm* — Mueting Raasch Group

(57) ABSTRACT

Disclosed are hard disk drives (HDDs), and methods for use therewith, that utilize reduced overhead servo fields, thereby simplifying the servo system. Reduced overhead servo fields may be of particular use in HDDs that utilize multi-revolution storage techniques to store data at much higher densities than what is possible for conventional HDDs. The relaxed performance requirements of high-density, multi-revolution drives provides opportunities for reducing servo overhead, thereby potentially further increasing the areal density capability of the magnetic media. Servo overhead may also be reduced by placing certain servo data on flash or other memory off of the media disk rather than in the servo fields written to the media disk.

17 Claims, 3 Drawing Sheets

MULTI-REVOLUTION HARD DISK DRIVES WITH REDUCED SERVO OVERHEAD

RELATED APPLICATION

This application is a Continuation-In-Part of U.S. patent application Ser. No. 18/672,636, filed on May 23, 2024, entitled "High Density Archival Storage Using Conventional Hard Disk Drive Architecture," the entire contents of which are hereby incorporated by reference.

TECHNICAL FIELD

The disclosure relates to servo systems in hard disk drives.

SUMMARY

In accordance with various aspects, the present disclosure provides methods for use with hard disk drives for storing data on a magnetic media disk. Such methods include writing a servo pattern on the magnetic media disk where the servo pattern includes reduced overhead servo fields, operating the hard disk drive in a high-density multi-rev mode, resulting in increased command completion time compared to conventionally operated hard disk drives, and using the increased command completion time to compensate for the reduced overhead servo fields.

In certain aspects, the reduced overhead servo fields may be accomplished by storing RRO correction information outside of the servo pattern. The RRO correction information may include ZAP data. The ZAP data may include ZAP write data and ZAP read data in which the ZAP write data is stored in a different location from the ZAP read data.

In certain aspects, the RRO correction information may be stored on the magnetic media disk, for example in data sectors.

In certain aspects, the hard disk drive stores data in shingled magnetic recording (SMR) bands, and the RRO correction information for use with an SMR band is stored in a location proximate to the SMR band.

In certain aspects, the RRO correction information for use with a data track is stored as part of the data track.

In certain aspects, the RRO correction information is stored in flash or other storage media off of the magnetic media disk.

In certain aspects, the RRO correction information is stored at a higher areal density than data written in the servo pattern.

In certain aspects, the methods further include storing ZAP values outside of the servo pattern and updating the ZAP values dynamically as the hard disk drive is used. The methods may further include calculating ZAP values prior to writing data to data sectors on the magnetic media disk and storing the ZAP values in volatile memory.

In certain aspects, the servo pattern includes a series of servo wedges, each servo wedge extending radially from an inner portion of the magnetic media disk to an outer portion of the magnetic media disk. In certain aspects, only one of the servo wedges includes full servo track identification information. In certain aspects, only some of the servo wedges include full servo sector preamble data.

In accordance with various aspects, the present disclosure provides hard disk drives that include a spinning magnetic media disk having a servo pattern that includes reduced overhead servo fields, the servo pattern comprising a series of servo wedges, each servo wedge extending radially from an inner portion of the magnetic media disk to an outer portion of the magnetic media disk, and wherein only one of the servo wedges includes full servo track identification information. Such disk drives further include a recording head configured to write data to and read data from the spinning magnetic media disk and a controller configured to control the recording head and to operate the hard disk drive in a multi-revolution mode in which multiple revolutions of the spinning magnetic media disk are used for read and/or write operations. The controller is further configured to utilize the multiple revolutions to compensate for the reduced overhead servo fields.

In accordance with various aspects, the present disclosure provides methods for use with a hard disk drive that includes a magnetic media disk, such methods including the determination of correction information for inclusion in servo data fields, writing a portion of the servo data fields in a servo pattern on the magnetic media disk where the portion of the servo data fields excludes a remaining portion of the correction information, storing the remaining portion of the correction information in a memory off of the magnetic media disk, and using information retrieved from the servo pattern on the magnetic media disk and the remaining portion of the correction information during operation of the hard disk drive.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
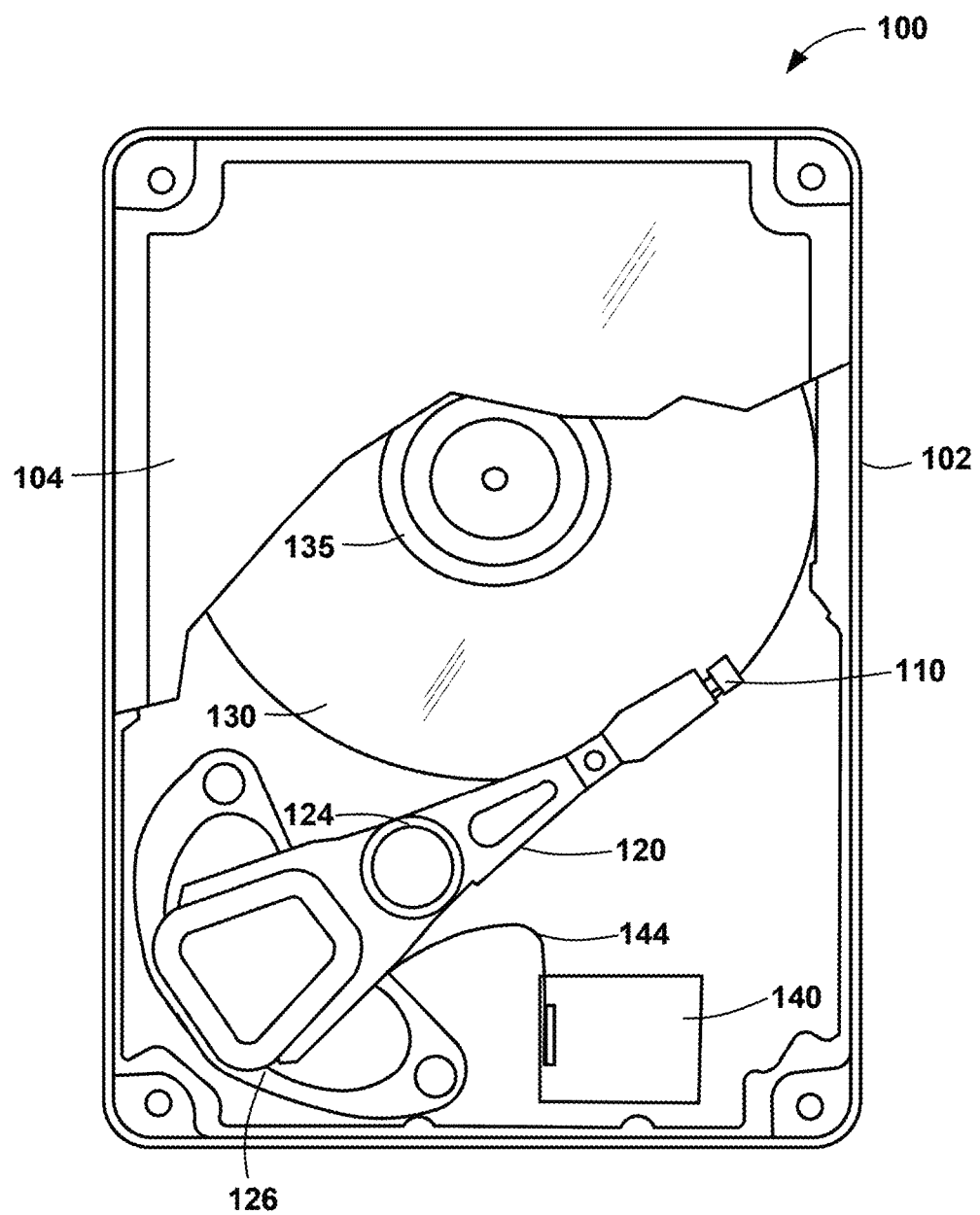
FIG. 1 schematically depicts an example hard disk drive that may be used in accordance with the present disclosure.

The present disclosure relates to simplifying the servo system in hard disk drives (HDDs) such as HDDs that utilize multi-revolution storage techniques to store data at much higher densities than what is possible for conventional HDDs. Multi-revolution HDDs (also referred to as multi-rev HDDs and multi-pass HDDs) provide increased storage densities at the cost of reduced performance. In accordance with the present disclosure, it is recognized that servo overhead can be reduced under the relaxed performance requirements of multi-rev drives. By reducing servo overhead, the areal density capability of the hard drive magnetic media may be extended. In accordance with the present disclosure, it is further recognized that reducing servo overhead may likewise be advantageous in single-rev drives, which could be implemented by placing certain servo data on flash (or other memory or storage off of the media disk) rather than in the servo fields written to the media disk.

Multi-revolution storage techniques are disclosed in U.S. patent application Ser. No. 18/672,636, filed on May 23, 2024, entitled "High Density Archival Storage Using Conventional Hard Disk Drive Architecture," which is herein incorporated in its entirety. Such techniques allow storing data onto magnetic media at densities far surpassing those available in conventional HDDs, and may be accomplished without requiring any changes to HDD components or architecture. As used herein, the term "conventional HDD" means a hard drive device that conforms to standard specifications (including standardly defined servo sectors, as further described herein) for general use, and that is mass manufactured and readily commercially available. Examples of conventional HDDs include drives that typically rewrite data in a single disk rotation, often referred to as "conventional magnetic recording" or CMR HDDs, and those that typically rewrite bands of data sequentially with each write to the band typically occurring in a single disk rotation, often referred to as "shingled magnetic recording" or SMR HDDs, as well as combinations and variations thereof.

Multi-rev HDDs use multiple revolutions of the media disks in the process of storing and retrieving data. This differs from conventional "single pass" disk drives, which typically store data sectors in a single revolution and retrieve data sectors in a single revolution. In multi-rev HDDs, the data can be written at a higher density than what is achievable with a single pass drive having the same components and architecture. During data storage, using multiple revolutions can provide servo system benefits such as allowing for the servo-mechanical system to be more "settled" prior to writing. During data retrieval, using multiple revolutions allows for reducing and/or cancelling noise via techniques of averaging the read-back signals from the multiple revs. Noise sources include electronic noise, reader noise, and media noise, as well as track misregistration and/or track following capability.

As such, without necessitating a change to the fundamental mechanical configuration and electrical design of a conventional HDD, a high-density archival storage mode can be realized by writing data to the spinning magnetic media at densities that exceed conventional areal density specifications, and then compensating by increasing command completion times while maintaining data reliability metrics such as unrecoverable error rate (UER) within acceptable or specified levels. In accordance with various aspects, increasing command completion times may involve utilizing one or more of multiple spin write processes, multi-dimensional error correcting codes (ECC), variable error correcting codes, increasing seek and settle times, intelligent write processes, multiple spin read processes, read verification and correction processes including always performing read-after-write (RAW), and using write until failure processes. The drive may realize additional areal density gains as compared to conventional HDD counterparts via changes in servo patterns including storing repeatable runout (RRO) correction information as data sectors instead of storing them as servo data, and eliminating redundant information in the servo pattern such as multiple track identification marks per disk revolution.

In certain aspects, it may be possible to spend revolutions estimating servo RRO correction values, known as zero acceleration profile (ZAP), and then writing or reading the data. This can optionally be used to reduce and/or eliminate the manufacturing test time required to calculate and store the ZAP data. Storing ZAP fields in data sectors reduces media space compared to storing ZAP in servo wedges, as is typically done in conventional HDDs. By storing the ZAP fields in data sectors, the ZAP fields are stored at a higher density compared to storing in servo wedges. Moreover, their values can be more easily updated and further refined with the collection of additional RRO samples from a particular track during additional rotations in a multi-rev drive.

Whereas the servo system of a conventional HDD is optimized for fast input-output performance per second (IOPs) as well as short seek and settle times, performance considerations are secondary to capacity gains in a multi-rev drive. This presents an opportunity to simplify the servo system in a multi-rev HDDs by prioritizing areal density and storage capacity above performance. In accordance with various aspects of the present disclosure, servo system efficiency in multi-rev HDDs may be managed by one or more of: storing ZAP and/or RRO correction information in data sectors rather than in servo wedges; updating ZAP values dynamically as the drive is used; reducing the quantity of "gray code" fields such as servo track identification (TID) and/or sector identification in servo wedges (for example, only storing full TID information once per revolution such as in the servo index mark (SIM) field, or using embedded data sector physical block address information for down track information); reducing servo address mark (SAM) preamble fields via on-the-fly post processing; and combinations of these. Simplified servo systems reduce servo overhead, providing opportunities for additional capacity gains.

Reference will now be made to the drawings, which depict one or more aspects described in this disclosure. However, it will be understood that other aspects not depicted in the drawings fall within the scope of this disclosure. Like numbers used in the figures refer to like components, steps, and the like. However, it will be understood that the use of a reference character to refer to an element in a given figure is not intended to limit the element in another figure labeled with the same reference character. In addition, the use of different reference characters to refer to elements in different figures is not intended to indicate that the differently referenced elements cannot be the same or similar. It will also be appreciated that the drawings are meant to illustrate certain aspects and arrangements of features in a way that contributes to their understanding and are not meant to be scale drawings that accurately represent size or shape of elements.

FIG. 1 schematically depicts a typical HDD device 100 that includes a recording head 110 having read and write capabilities. Recording head 110 is disposed on the end of an actuator arm 120 that is rotationally movable around a pivot 124 by use of a voice coil motor 126. The recording head 110 is positioned in close proximity to the surface of magnetic media disk 130 such that the recording head can write data to and read data from tracks on the magnetic media 130 as it spins by action of a spindle motor 135. Controller electronics 140 may be coupled to the voice coil motor 126 and recording head 110 via a flex cable 144 that connects to traces on the actuator 120. Preamp electronics (not indicated) are typically disposed close to the recording head 110 for conditioning signals to and from the recording head. Controller electronics 140 may also be coupled to spindle motor 135, and thereby control the spinning of the media disk(s) 130 along with the movement of the actuator 120 and the reading and writing of data via recording head 110. The internal components of HDD 100 are contained within an enclosure 102, including cover 104, which is shown partially cut away to reveal the internal components. A host device can communicate with HDD 100 through a standardized interface (not shown).

HDD 100 can operate on any magnetic recording principle, whether that be conventional magnetic recording (CMR), shingled magnetic recording (SMR), heat-assisted magnetic recording (HAMR), or any other type of recording technique, including combinations thereof. While the actuator 120 is shown to move rotationally, the present disclosure is not limited to how the actuator moves and encompasses linear actuation and multiple rotary actuators. Likewise, recording heads such as recording head 110 can be provided on movable or stationary rails, or in any other suitable manner now known or later contemplated.

Figure 2:
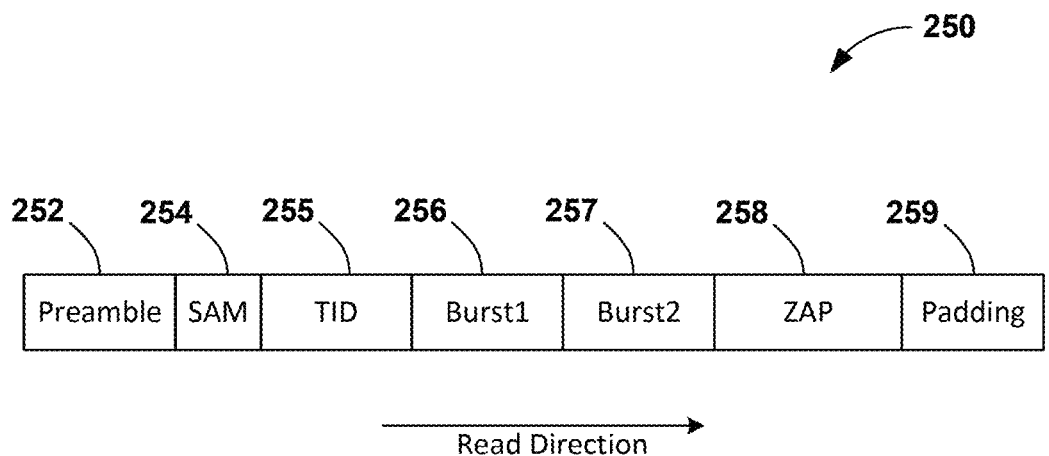
FIG. 2 schematically depicts the parts of a standard, conventionally defined servo sector.

Servo-writing defines the data tracks and servo sectors on the media disks so that the HDD servo system can identify the track and servo sector position of the recording head as well as the offset of the read head position relative to the track centerline. The difference between the measured location of the recording head from its desired position is known as a position error signal (PES). The HDD servo mechanism generates the position feedback PES signal by using the servo patterns as reference. FIG. 2 schematically depicts the parts that make up a typical servo sector 250 used in conventional HDDs. While there may be some variations among different HDD device models and manufacturers, the types of information in the servo sectors and the general format in which they are provided are common among conventional HDDs.

Servo positioning information is written to the media at the time of device manufacture. Ideally, the servo positioning information is written in concentric circles or some other regular geometric shape, like a spiral. Due to mechanical and electrical noise present while writing this information, the positioning information is never perfectly placed. Servo systems can compensate for known irregularities in the locations of the servo positioning information. Predictable errors are categorized as repeatable runout (RRO). In addition to the "written in" pattern irregularities, RRO has other sources such as disk slippage, thermo-mechanical changes to disk geometry, and other such effects. Conversely, non-repeatable runout (NRRO) sources, such as vibrations, windage, and other stochastic noise sources are non-predictable. To minimize the movement of the recording heads from repeatable runout, the RRO of each track is characterized and correction information is calculated. As used herein, such correction information is called zero acceleration profile (ZAP) data. ZAP data are used by the servo positioning system to avoid moving the recording head in an attempt to follow these irregularities, facilitating straighter data tracks and reducing mechanical noise excitations.

Referring again to the servo sector 250 shown in FIG. 2, the preamble 252, also referred to as the AGC preamble, is a signal written with constant frequency and amplitude that is used for automatic gain control and for preparing drive to receive information from a servo sector. The SAM 254 is the servo address mark, which is an index signal that sets coarse timing and can be used to tune up disk rotation speed or to read a whole track into an internal buffer. Note that on the first sector at the index, a separate pattern is used, which is referred to as the SIM or Servo Index Mark. The Track Identification TID 255 is a servo field that encodes a servo-track number, commonly using a gray code, and may include cross-track and down-track positioning information. Burst1 256 and Burst2 257 are position signals written with constant frequency and amplitude to generate PES for fine positioning of the HDD actuator arm. As mentioned, ZAP 258 primarily includes correlation information for correcting servo wedge RRO errors. Finally, padding 259 is included at the end of the servo sector to provide servo field overwrite protection from system timing variation. Padding 259 is often left unwritten or may be erased with an AC or DC pattern.

In conventional HDDs, ZAP data is stored as part of the servo field, as indicated in FIG. 2. To ensure reliable signal recovery, the servo field is on average four times less dense compared to the data fields on the same track. In a multi-rev drive, it is possible to locate the ZAP data in a data field at higher data rates instead of storing it in the servo wedge and therefore save disk space. The ZAP data may also be stored in a separate area such as in flash, in a separate region on the magnetic media disk, in different sectors proximate to the same SMR band, or may be stored as part of the track to be written/read such as in the first sector after an index or other well-defined spot on the drive. Moreover, the write ZAP and read ZAP may be located in different or various places, and at a higher areal density or in a way to reduce its disk space consumption.

In multi-rev drives that record in an SMR format (shingled recording), a whole band of data is written at a time, sequentially, track by track. During manufacturing of an SMR drive, the factory servo-writing process would typically spend one or two disk revolutions per track offset (with two offsets per data track) learning the ZAP and written in repeatable runout (WIRRO) corrections for a typical HDD. ZAP is needed to correct positional disturbances that were written in at the time of servo writing along with micromagnetic variations in media, which constitute WIRRO. ZAP corrects for RRO and WIRRO, giving a TPI gain equivalent to about 4% for SMR. This is typically using one or two revolutions for track WIRRO characterization. Further TPI gains are possible if additional revolutions are used to make a more accurate WIRRO characterizations, but revolutions are costly (from a manufacturing test time perspective) and so the one or two revolutions typically used reflects cost optimization.

In multi-rev HDDs, performance is less critical, and so additional revs are available and can be spent the first time an SMR band is opened for writing. Such multi-rev writing can be used to increase recording density, thus having a direct impact on tracks per inch (TPI) capability. In a multi-rev HDD, track information may be stored in the same place as the regular ZAP data, in some cases replacing the original ZAP data with the new actual data path information. In other words, rather than using the information from a standard ZAP data field to write the next track, information for the just written track may be used since in a multi-rev writing scheme that information is read back after being written and as such is available to use in this manner. This methodology may lead to further improvements in TPI, which gains are in addition to the areal density gains from placing ZAP information in data sectors instead of servo sectors. Based on TPI capability versus the revs (iterations) needed for ZAP learning, the potential gains beyond the two revolutions per track offset conventional situation are in the realm of 0.5% TPI capability.

In multi-rev HDDs, an alternate approach is to not store ZAP at all. In this approach, the WIRRO ZAP data may be characterized and/or calculated prior to writing data, and then kept in volatile memory. Hybrid approaches are also possible in which ZAP not stored in a servo sector but is instead temporarily stored, for example for the most recently used SMR bands.

In reference again to FIG. 2, each media disk surface is divided into a plurality of servo wedges, each including servo marks. Only one wedge has an index mark with full track ID information (the SIM, or servo index mark), with the remaining marks including reduced information (SAMs, or servo address marks). In this way, the SIM with full cross-track and down-track positional information is encountered only once per revolution. This is different from conventional servo patterns, which typically embed full positional information at multiple wedges around the disk rotation. Given that lower performance is often expected in multi-rev drives, and therefore not an issue, the size of the track ID gray code can be reduced from that of a distributed gray code in the following manner. The full track ID is stored at the index mark, either just before or after the SIM. For the remaining servo marks across the track, a reduced track ID is used so that the track ID range is within the expected six-sigma limit (or other defined limit) of track motion. For down-track information, it is possible to count from the SIM or to even read physical block address (PBA) data from data sectors to determine the rotational location.

Figure 3:
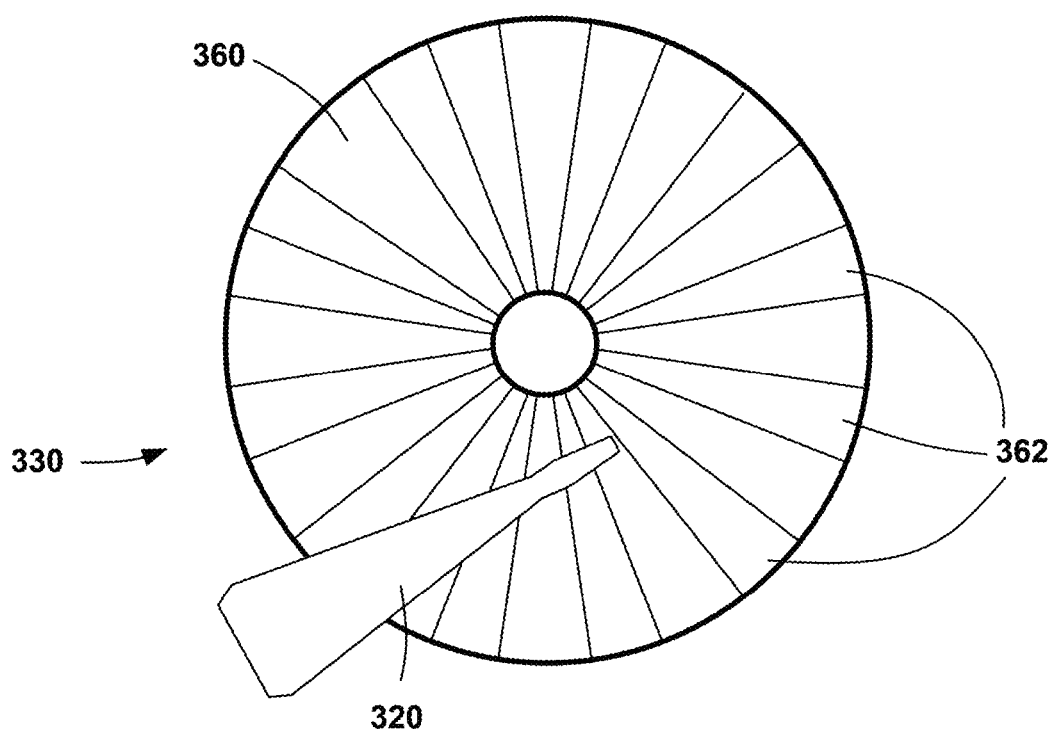
FIG. 3 schematically illustrates servo wedges on a magnetic storage media disk in accordance with aspects of the present disclosure.

FIG. 3 depicts a simplified version of a servo wedge configuration for use with various aspects of the present disclosure, showcasing the servo index mark (SIM) wedge 360 and the remaining SAM wedges 362. Here we see that the SIM wedge 360 is longer (wider wedge) to accommodate a longer gray code that has more information about the track ID (TID). The remaining wedges, such as wedges 362, can either have a reduced TID with information for both the down track and cross track position, with information for only the down track information, or with none at all. The down track information could be stored in the data fields or calculated from the data sector information and count from SIM.

As a further example, post processing on-the-fly may be used to reduce the SAM and preamble. The preamble and timing mark are used for determining amplitude and timing information for the servo wedge. Adjustments can be made that allow for recovery of the gray code and any additional servo field information. The amplitude of a signal when the head is on-track is similar from servo wedge to servo wedge, particularly when heat is constant and transient noises have stabilized. Therefore, it is possible to reduce the number of servo wedges having the full servo sector preamble and feed forward the amplitude information from previously measured wedges. Since the information in the SAM/SIM and track ID are all Manchester encoded, and are timing self-recovery codes, if the sampling rate is sufficient, there should be enough samples to reconstruct the entire signal including timing and amplitude. Using this amplitude and timing information, the bursts (which include sinusoidal information) may be used to reconstruct the entire signal and determine the PES at similar precision.

Figure 4:
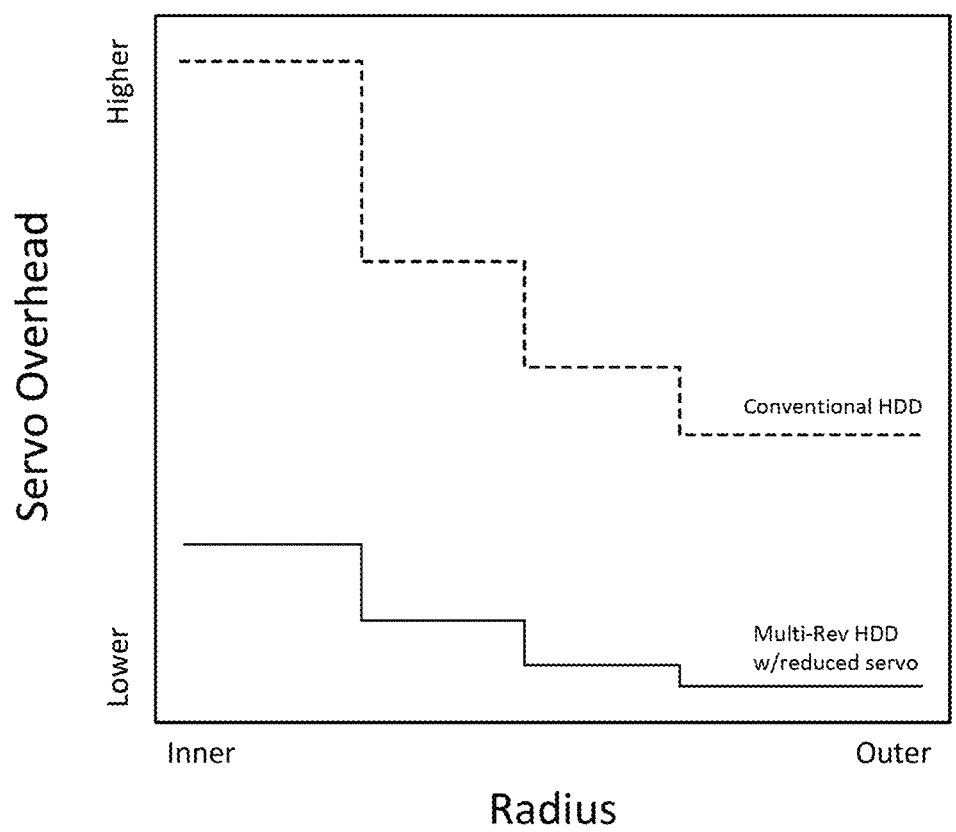
FIG. 4 shows a graph comparing the servo overhead for a conventional HDD versus a multi-rev HDD having reduced servo overhead in accordance with aspects of the present disclosure.

FIG. 4 is a graph indicating the relative servo overhead required over the radius of the magnetic media disk from the inner diameter to the outer diameter for a conventional HDD (dashed line) and for a multi-rev HDD that employs various servo simplification techniques in accordance with the present disclosure.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (for example, all described acts or events may not be necessary to carry out the techniques). In addition, while certain aspects of this disclosure are described as being performed by a single module or unit for purposes of clarity, it should be understood that the techniques of this disclosure may be performed by a combination of units or modules.

All scientific and technical terms used herein have meanings commonly used in the art unless otherwise specified. The definitions provided herein are to facilitate understanding of certain terms used frequently herein and are not meant to limit the scope of the present disclosure.

As used herein, the term "configured to" may be used interchangeably with the terms "adapted to" or "structured to" unless the content of this disclosure clearly dictates otherwise.

As used herein, the term "or" refers to an inclusive definition, for example, to mean "and/or" unless its context of usage clearly dictates otherwise. The term "and/or" refers to one or all of the listed elements or a combination of at least two of the listed elements.

As used herein, the phrases "at least one of" and "one or more of" followed by a list of elements refers to one or more of any of the elements listed or any combination of one or more of the elements listed.

As used herein, the terms "coupled" or "connected" refer to at least two elements being attached to each other either directly or indirectly. An indirect coupling may include one or more other elements between the at least two elements being attached. Further, in one or more embodiments, one element "on" another element may be directly or indirectly on and may include intermediate components or layers therebetween. Either term may be modified by "operatively" and "operably," which may be used interchangeably, to describe that the coupling or connection is configured to allow the components to interact to carry out described or otherwise known functionality.

The singular forms "a," "an," and "the" encompass embodiments having plural referents unless its context clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like.

Reference to "one embodiment," "an embodiment," "certain embodiments," or "some embodiments," and so forth, means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

What is claimed is:

1. A method for use with a hard disk drive that includes a magnetic media disk, the method comprising:
   writing a servo pattern on the magnetic media disk that includes reduced overhead servo fields;

operating the hard disk drive in a high-density multi-rev mode, resulting in increased command completion time compared to conventionally operated hard disk drives; and using the increased command completion time to compensate for the reduced overhead servo fields.

2. The method of claim 1, further comprising storing RRO correction information outside of the servo pattern.

3. The method of claim 2, wherein the RRO correction information includes ZAP data.

4. The method of claim 3, wherein the ZAP data includes ZAP write data and ZAP read data, and wherein the ZAP write data is stored in a different location from the ZAP read data.

5. The method of claim 2, wherein the RRO correction information is stored on the magnetic media disk.

6. The method of claim 5, wherein the RRO correction information is stored in data sectors.

7. The method of claim 5, wherein the hard disk drive stores data in shingled magnetic recording (SMR) bands, and wherein the RRO correction information for use with an SMR band is stored in a location proximate to the SMR band.

8. The method of claim 5, wherein the RRO correction information for use with a data track is stored as part of the data track.

9. The method of claim 2, wherein the RRO correction information is stored in flash or other storage media off of the magnetic media disk.

10. The method of claim 2, wherein the RRO correction information is stored at a higher areal density than data written in the servo pattern.

11. The method of claim 1, further comprising storing ZAP values outside of the servo pattern and updating the ZAP values dynamically as the hard disk drive is used.

12. The method of claim 1, further comprising calculating ZAP values prior to writing data to data sectors on the magnetic media disk and storing the ZAP values in volatile memory.

13. The method of claim 1, wherein the servo pattern comprises a series of servo wedges, each servo wedge extending radially from an inner portion of the magnetic media disk to an outer portion of the magnetic media disk.

14. The method of claim 13, wherein only one of the servo wedges includes full servo track identification information.

15. The method of claim 13, wherein only some of the servo wedges include full servo sector preamble data.

16. A hard disk drive comprising:
a spinning magnetic media disk having a servo pattern that includes reduced overhead servo fields, the servo pattern comprising a series of servo wedges, each servo wedge extending radially from an inner portion of the magnetic media disk to an outer portion of the magnetic media disk, and wherein only one of the servo wedges includes full servo track identification information;
a recording head configured to write data to and read data from the spinning magnetic media disk; and
a controller configured to control the recording head and to operate the hard disk drive in a multi-revolution mode in which multiple revolutions of the spinning magnetic media disk are used for read and/or write operations, and configured to utilize the multiple revolutions to compensate for the reduced overhead servo fields.

17. A method for use with a hard disk drive that includes a magnetic media disk, the method comprising:
determining correction information for inclusion in servo data fields;
writing a portion of the servo data fields in a servo pattern on the magnetic media disk, the portion of the servo data fields excluding a remaining portion of the correction information;
storing the remaining portion of the correction information in a memory off of the magnetic media disk; and
using information retrieved from the servo pattern on the magnetic media disk and the remaining portion of the correction information during operation of the hard disk drive.

* * * * *